O. SWANSON.
PISTON ROD LUBRICATOR AND NUT RETAINER.
APPLICATION FILED NOV. 3, 1919.
1,383,496.
Patented July 5, 1921.
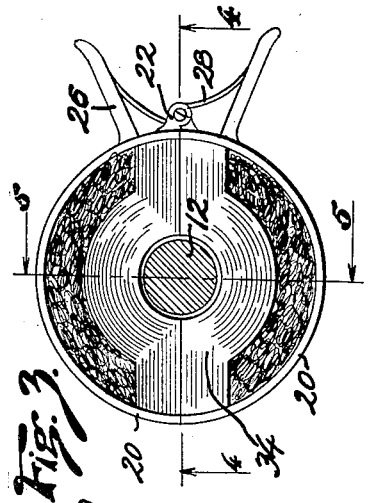
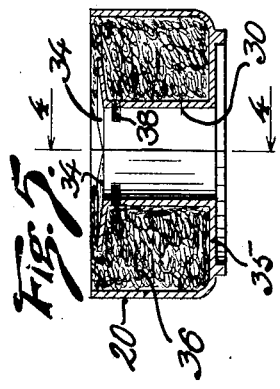
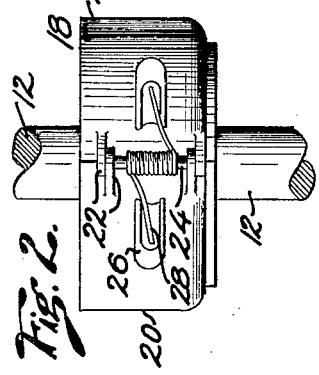
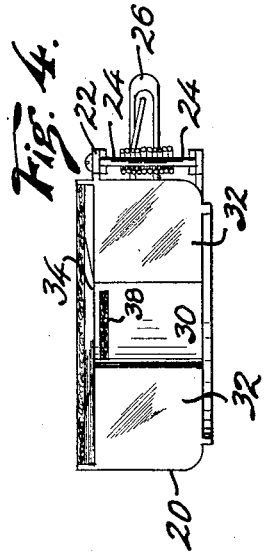
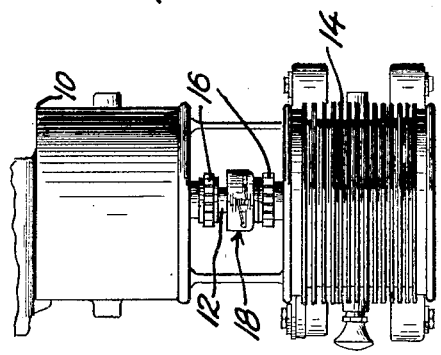
Olof Swanson. Inventor
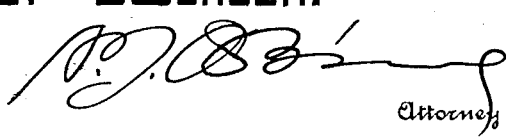
Attorney

UNITED STATES PATENT OFFICE.

OLOF SWANSON, OF DENVER, COLORADO.

PISTON-ROD LUBRICATOR AND NUT-RETAINER.

1,383,496.  Specification of Letters Patent.  Patented July 5, 1921.

Application filed November 3, 1919. Serial No. 335,539.

*To all whom it may concern:*

Be it known that I, OLOF SWANSON, a citizen of the United States, residing at the city and county of Denver and State of Colorado, have invented certain new and useful Improvements in Piston-Rod Lubricators and Nut-Retainers; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a simple means for lubricating the piston rods of locomotive air pumps. It is also an object to make the lubricator serve as means for preventing movement in the direction of the axis of the piston rod of the nuts on the stuffing box through which the piston rod passes.

Briefly, the invention comprises a pair of containers partially open at the top for the introduction of oil and having a generally semi-circular construction. These devices are hingedly connected and normally forced into engagement with each other by spring means. The inner wall of each member is provided with a slot through which waste or some other material which will act as a lubricant wick projects. The projecting wick bears upon the piston rod and keeps it lubricated.

In the drawings forming a part of this specification:

Figure 1 is an elevation showing the use of the device.

Fig. 2 is an elevation on a larger scale showing the device mounted upon the piston rod.

Fig. 3 is a plan.

Fig. 4 is an elevation of the inner face of one of the members of the device, as indicated by lines 4—4 of Figs. 3 and 5.

Fig. 5 is a vertical section on the line 5—5 of Fig. 3.

The drawings show in Fig. 1 a steam cylinder 10, from which projects a piston rod 12, extending into an air compresser 14. Both the cylinder 10 and the compresser 14 carry stuffing boxes having adjustable nuts 16 through which the piston rod 12 extends. The lubricator 18 is mounted on the rod between the nuts 16 and is of such height as to approximately fill the space between the nuts 16 when the boxes are first packed. As shown, the nuts are partially screwed up after the packing has become somewhat worn. If either of the nuts 16 should tend to loosen, its movement would be stopped by engagement with the lubricator 18 before it became entirely unthreaded.

The lubricator 18 is composed of two similar, semi-circular members having outer walls 20. These members are provided with ears 22, through which there passes a pintle 24. Each member is also prvided with a handle 26, and a spring 28 passes around the pintle and bears upon the handles in such manner as to press the two members 20 into engagement with each other. The inner face of each member comprises a semi-cylindrical wall 30 and a flat vertical wall 32 on each side thereof. The top of the wall 30 is provided with an upwardly and outwardly flared flange 34, the upper edge of which, however, terminates below the upper edge of the outer wall 20. Each member has a bottom 35, which, in conjunction with the inner and outer walls, forms a receptacle which receives waste or other lubricant wicking which is fed with oil through the space between the upper edges of the wall 20 and flange 34. The curved wall 30 of each member is provided with a horizontal slot 38, through which the wick material 36 projects for engagement with the piston rod 12 when in position thereon.

It is obvious that the rod will be thoroughly lubricated as it reciprocates through this device. In order to remove the device from the rod it is merely necessary to press upon the handles 26 and withdraw the lubricator from position. Any oil that tends to work up around the top of the lubricator will flow over upon the flanges 34 to the piston, thereby being prevented from rising over the top of the higher, outer walls 20. The flanges have the further function of intercepting steam which may escape from the upper stuffing box when the packing becomes badly worn and loose; in this way the steam is prevented from blowing the waste and lubricant out of the containers, and also from condensing in the containers, the water of condensation running down the flanges to the piston rod and then down the rod.

I claim:

1. A piston-rod lubricator, comprising a pair of members adapted to fit about the rod and carry lubricant, and means to retain said members on the rod, each member having an inner wall with a slot in said wall adjacent the top thereof and spaced from the bottom thereof.

2. A piston-rod lubricator, comprising a pair of separable members adapted to fit upon opposite sides of the rod and carry lubricant, and means to retain the members on the rod, each member having an inner wall with a slot in said wall adjacent the top thereof and spaced from the bottom thereof.

3. A piston-rod lubricator, comprising a lubricant container adapted to be held to a vertically disposed piston rod, said container having an outer wall and an inner curved wall to engage the piston rod, and a slot in said inner wall for the passage of lubricant to the piston rod, said slot being adjacent the top of said inner wall and spaced from the bottom thereof.

4. A piston-rod lubricator, comprising a lubricant container adapted to be held to the piston rod, said container having an outer wall and an inner curved wall to engage the piston rod, and a slot in said inner wall for the passage of lubricant to the piston rod, the top of said inner wall having an upwardly and outwardly extending flange whose upper edge is lower than the upper edge of said outer wall.

5. A piston-rod lubricator, comprising a pair of separable opposing members adapted to fit about a vertically disposed piston rod, and means to retain the members on the rod, each member constituting a container having an outer wall and an inner wall curved to engage the piston, each inner wall having a slot therein adjacent its upper portion and spaced from its lower portion for the passage of lubricant to the rod.

6. A piston-rod lubricator, comprising a pair of separable opposing members adapted to fit about said rod, means to retain the members on the rod, each member constituting a container having an outer wall and an inner wall curved to engage the piston, each inner wall having a slot therein for the passage of lubricant to the rod, the top of each inner wall having an outwardly and upwardly extending flange whose upper edge is spaced from and is lower than the upper edge of said outer wall, and a lubricant wick in each of said containers projecting into said slots.

7. A piston-rod lubricator, comprising a pair of separable opposing members adapted to fit about said rod, each member constituting a container having an outer wall and an inner wall curved to engage the piston, each inner wall having a slot therein for the passage of lubricant to the rod, the top of each inner wall having an outwardly and upwardly extending flange whose upper edge is spaced from and is lower than the upper edge of said outer wall, and a lubricant wick in each of said containers projecting into said slots, said members being hingedly connected and provided with spring means normally urging them together to close them about the piston.

8. A piston-rod lubricator, comprising a lubricant container adapted to be held to the piston rod, said container having an outer wall and an inner curved wall to engage the piston rod, and an aperture in said inner wall for the passage of lubricant to the piston rod, the top of said inner wall having an upwardly and outwardly extending flange.

9. A piston-rod lubricator comprising a pair of separate lubricant containers adapted to be placed upon a vertically disposed piston rod, each container having an outer wall and an inner curved wall, the inner wall having means for the passage of lubricant to the rod, and an upwardly and outwardly extending flange upon the upper edge of the inner wall.

10. A piston-rod lubricator composed of two separate lubricant containers having inner and outer walls and an upwardly and outwardly extending flange on each inner wall whose outer edge is spaced from the outer wall.

11. A piston-rod lubricator having an inner wall and a top flange thereon tapering downwardly toward the rod.

12. A piston-rod lubricator composed of distinct containers, each having an oil outlet at or near the top thereof and each having its outer side wall and bottom wall imperforate.

In testimony whereof I affix my signature.

OLOF SWANSON.